United States Patent [19]

Mendicino

[11] 4,083,856

[45] Apr. 11, 1978

[54] ADDITION OF UNSATURATED EPOXY MONOMER TO Si-H WITH CHLOROPLATINIC ACID AND HCl-ACCEPTOR

[75] Inventor: Frank D. Mendicino, Marietta, Ohio

[73] Assignee: Union Carbide Corporation, New York, N.Y.

[21] Appl. No.: 403,313

[22] Filed: Oct. 3, 1973

Related U.S. Application Data

[63] Continuation of Ser. No. 851,087, Aug. 18, 1969, abandoned.

[51] Int. Cl.$^2$ .............................................. C07F 7/18
[52] U.S. Cl. ........................... 260/348.12; 260/348.41; 260/46.5 Y
[58] Field of Search .................. 260/46.5 Y, 348.41, 260/348.12

[56] References Cited

U.S. PATENT DOCUMENTS

| 3,130,207 | 4/1964 | Greenspan et al. | 260/348.5 L |
|---|---|---|---|
| 3,516,964 | 6/1970 | Patterson | 260/46.5 |

FOREIGN PATENT DOCUMENTS 1,015,782   9/1957   Germany ...................... 260/348.5 L

OTHER PUBLICATIONS

Plueddemann et al., E.P., Jour. Amer. Chem. Soc., vol. 81 (1959), pp. 2632-2635.
Chemical Abstracts, vol. 71 (1969), 85166x.
"Peracetic Acid and Derivatives", Union Carbide Chemicals Company (1957), pp. 6, 7, 8.

Primary Examiner—Norma S. Milestone
Attorney, Agent, or Firm—George A. Skoler

[57] ABSTRACT

The method of this invention relates to the manufacture of epoxy substituted siloxanes by reacting an ethylenically unsaturated epoxy monomer with Si-H compound using chloroplatinic acid as the catalyst. The improvement involves adding a hydrochloride acceptor to the reaction to sequester HCl present from decomposition of the catalyst.

4 Claims, No Drawings

ADDITION OF UNSATURATED EPOXY MONOMER TO Si-H WITH CHLOROPLATINIC ACID AND HCl-ACCEPTOR

This is a continuation of application Ser. No. 851,087 filed Aug. 18, 1969 now abandoned.

This invention relates to the well known addition reaction involving an ethylenically unsaturated 1,2-epoxy compound with a silicon hydride in the presence of chloroplatinic acid as the catalyst for such addition reaction. More particularly, this invention relates to an improvement in the aforementioned addition reaction whereby to avoid undesirable ring opening of the 1,2-epoxy ring during the reaction whereby to enhance the yield of epoxy substituted silicon compounds.

There are described in U.S. Pat. Nos. 2,946,701 and 3,120,546, methods for reacting an unsaturated epoxy compound with a silicon hydride in the presence of chloroplatinic acid to effect addition through the unsaturation to the silicon compound whereby the hydrogen adds across the double bond and the 1- carbon atom, relative to the double bond, adds directly to the silicon to be bonded thereto. Although this method is employed commercially for the manufacture of epoxy silicon compounds, it has been determined that this method results in reaction of the epoxy radical of the unsaturated epoxy compound either during or after the addition reaction whereby to remove or reduce the concentration of epoxy radicals in the final product. Since the presence of the epoxy ring is important to the utilization of the silicon compound resulting from the reaction in coupling reactions with polymeric resins which have functional reactivity with the epoxy group, any reduction in the amount of epoxy groups available for such reaction deleteriously effects the complete utilization of such materials. It has been found that as a result of the addition reaction with chloroplatinic acid, there is formed hydrogen chloride in a small concentration. However, the amount formed is sufficient to adversely effect the oxirane or epoxy concentration of the resulting product of the reaction. This adverse effect is noted in the viscosity of the product of reaction. When epoxy groups in the final product have been effected by ring opening resulting from the hydrogen chloride formed from the decomposition of the chloroplatinic acid, it has been noted that the viscosity of the end product increases measurably, in most cases significantly, denoting crosslinking through the opening epoxy groups. As a result, in order to obtain maximum utilization of an epoxy silicon compound for coupling purposes, it is necessary to use an added concentration of such epoxy compounds to provide the amount of epoxy groups necessary to achieve the desired coupling effect.

It has been found that this effect, culminating in crosslinking of the products of the reaction can be avoided by providing in the reaction medium a small amount of a hydrochloride acceptor. The hydrochloride acceptor serves the function of picking up the hydrogen chloride that is formed and withdrawing it from the reaction medium in a relatively inert form. The product of the reaction between the hydrogen chloride and the hydrochloride acceptor can be left in the reaction medium without disturbing the quality of the product on aging.

The amount of the hydrochloride acceptor provided in the reaction medium is sufficient to sequester the hydrogen chloride formed during the reaction. Usually a molar excess of the acceptor is provided. That is, the amount of acceptor necessary for withdrawing the hydrogen chloride produced in the reaction is sufficient to remove, mole for mole, all of the hydrogen chloride present in the reaction medium.

The hydrochloride acceptors which may be used include inorganic hydrochloride acceptors and organic hydrochloride acceptors. It has been found that the inorganic acceptors are more desirable simply because they are typically insoluble in the reaction system and therefore can be suspended therein. As a result, the hydrochloride salt by-product which is also insoluble in the system, can be removed very simply by filtration, distillation, decantation, and the like. On the other hand, certain organic hydrochloride acceptors are soluble in the reaction medium. However, the salts which are formed with hydrogen chloride are typically insoluble in the reaction medium and as a result such insoluble salts can be removed with facility as described. Certain hydrochloride acceptors, even as salts, are soluble in the reaction medium and will be passed on through the total process unless careful distillation means are employed. However, such salts normally do not adversely affect the utility of the reaction product, i.e., the epoxy substituted silicon compound, and therefore such salts may be left in the product.

The inorganic hydrochloride acceptors useable in the practice of this invention are desirably alkali or alkaline earth metal salts of relatively weak acids. Illustrative of such salts are, for example, carbonic acid salts such as sodium carbonate, potassium carbonate, lithium carbonate, cesium carbonate, rubidium carbonate, potassium bicarbonate, sodium bicarbonate, lithium bicarbonate, cesium bicarbonate, magnesium carbonate, calcium carbonate, barium carbonate; acetic acid salts such as alkali metal acetates, e.g., sodium acetate, lithium acetate, potassium acetate; acetates of alkaline earth metals, and the like; alkaline earth metal hydroxides such as magnesium hydroxide, calcium hydroxide, strontium hydroxide, barium hydroxide, and the like. The desirable organic hydrochloride acceptors are the tertiary amines, such as trialkyl amines, e.g., trimethyl amine, triethyl amine, tripropyl amine, tri-n-butyl amine, diethylmethyl amine, methyl ethyl propyl amine, triisopropanol amine, triethanol amine, and the like; pyridine and substituted pyridine such as 2-methyl pyridine, 4-ethyl pyridine, and the like; the aromatic tertiary amines, such as triphenylamine, tribenzylamine; and the like.

The ethylenically unsaturated 1,2-epoxy monomers which are reacted with the silicon hydride compound may be characterized by the following formula:

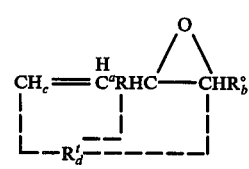

wherein R is a covalent bond, a di- or trivalent aliphatic hydrocarbon radical or an arylene radical; R° is hydrogen or is alkyl of from 1 to about 4 carbon atoms, preferably methyl; R' is a divalent or trivalent aliphatic alkylene radical; $a$, $b$, and $d$ are either 0 or 1; and $c$ is 0, 1 or 2.

Illustrative of ethylenically unsaturated epoxy monomers which are encompassed by the above formula are the following:

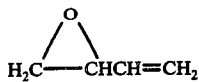

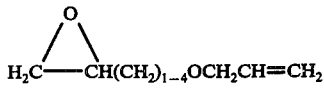

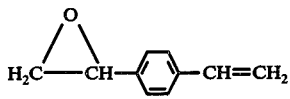

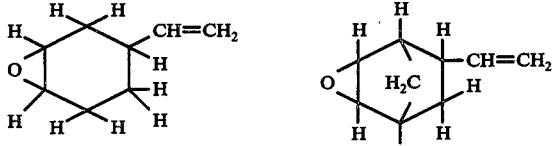

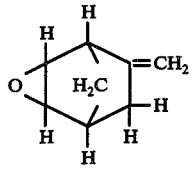

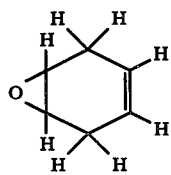

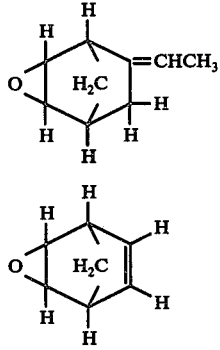

The silicon hydride compounds which may be reacted with the ethylenically unsaturated epoxy monomer as described above, and hereafter, include a silane and a siloxane characterized by having the following average formula:

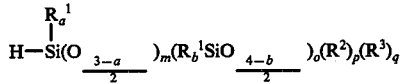

wherein $R^1$ is hydrogen or a monovalent organic group free of ethylenic or acetylenic unsaturation which is bonded to silicon by a carbon to silicon bond; $R^2$ is a hydrolyzable or condensible radical; $R^3$ is a member selected from the group consisting of hydrogen, alkyl, aryl and acyl; $m$ is 0 or 1; $a$ has an average value of 0 to 2, inclusive; $b$ has an average value of 0 to 3, inclusive; $o$ is 0 or 1; $p$ is equal to 3-a when $m$ is 0, and when $m$ is 1, $p$ is 0; and $q$ is 0 when $p$ is equal to 3-a and $q$ is 0 or a positive number when $m$ is 1.

The amount of chloroplatinic acid which is added to the reaction medium is that amount which is usually employed in such addition reactions. Typically, one may employ from about 15 parts per million up to about 150 parts per million, based on the weight of the reactants, of the chloroplatinic acid catalyst. Preferably, the amount of the catalyst is kept within the range of about 20 parts per million to about 100 parts per million. Optimum results have been obtained in the range of about 23 parts per million to about 60 parts per million.

The reaction may be carried out in the presence of solvents if desired. Suitable solvents are those which dilute the reactants as well as the catalyst, whereby to effect a liquid phase reaction, and which do not interfere with the reaction. Illustrative solvents include the hydrocarbon solvents such as the liquid aliphatic hydrocarbons, e.g., hexane, octane, nonane, dodecane, mineral spirits and the like; the aromatic hydrocarbon solvents such as toluene, xylene, and the like. Other solvents suitable for use include the ether solvents, preferably those which have a boiling point not less than the temperature at which the reaction is effected. Often times it is desirable to employ an ether solvent having a boiling point considerably exceeding the temperature at which the reaction is effected. Illustrative of these are the conventional dialkyl ethers, such as dihexyl ether, dioctyl ether, the dialkyl ethers of ethylene glycol such as dimethyl ether of ethylene glycol, di-n-propyl ether of ethylene glycol, and the like, as well as the dialkyl ethers of polyalkylene glycols such as the dialkyl ethers of polyethylene glycol, and the like.

As indicated above it is preferred to operate the reaction with a small excess of the ethylenically unsaturated epoxy monomer present. Most desirably, the amount of the ethylenically unsaturated epoxy monomer is not more than 20 weight per cent in excess of that amount necessary to effect the reaction with all of the silicon-hydrogen present. Thus, for practical purposes, the maximum amount of ethylenically unsaturated epoxy monomers is not in excess of 20 weight per cent greater than the stiochiometric equivalent necessary for complete reaction. Greater amounts can be employed but there is no advantage in doing so. The preferred range of the ethylenically unsaturated epoxy monomer employed in the reaction is from about the stoichiometric equivalent to about 20 weight per cent excess thereof with respect to the silicon-hydrogen present in the silicon compound being reacted.

An added embodiment involves pretreating the ethylenically unsaturated epoxy monomer being employed. Such pretreatment involves bubbling dry nitrogen gas through a liquid body of the ethylenically unsaturated epoxy monomer to sparge it. It has been found that such technique removes contaminants which adversely effect the addition reaction in the presence of chloroplatinic acid. Surprisingly, it has been possible by such sparging methods to obtain a substantial increase in the amount of reaction between the ethylenically unsaturated epoxy compound and the silicon-hydrogen compound.

The quantity of the hydrochloride acceptor present in the reaction, as indicated above, is typically, on a mole basis, at least equal to about the number of molecules of chlorine introduced into the reaction medium as a part of the chloroplatinic acid. That value represents the minimum amount employed. The upper or highest amount, which typically may not provide better results than the lower concentration is about 1 weight per cent based on the total weight of materials present in the reaction. A greater amount of the hydrochloride acceptor can be employed, though no advantage is seen in this.

Though this invention has already been described with substantial specificity, reference is made to the following examples to characterize more specific applications of this invention.

EXAMPLE I

A 20 mole per cent excess of 3,4-epoxycyclohexylethylene, a total of 119.6 grams, was charged to a 1 liter pot fitted with agitator, addition funnel, water condenser, thermometer and nitrogen sparge tube. To the addition funnel was charged 200 grams of an SiH fluid: a trimethyl silyl endblocked dimethyl silyloxy methyl hydrogen siloxane copolymer having a viscosity of 33.5 centistokes at 25° C. and a SiH content of 90 cc $H_2$/gram. It was nitrogen sparged lightly at room temperature. Then the contents of the pot were heated to 100° C. with a 0.25 liter per minute nitrogen sparge with agitation. After which, the contents of the pot were cooled to 80° C. and the charge of 3,4-epoxycyclohexylethylene was adjusted to compensate for any losses. To the pot was added 0.25 weight per cent, based on the total weight of the epoxy monomer and SiH fluid weight, of sodium carbonate. Then about 10 per cent of the SiH fluid in the addition funnel and 1.3 cc of a 3.3 weight per cent chloroplatinic acid in dimethyl ether of ethylene glycol, providing 50 parts per million of platinum, were added to the pot. At this point an exotherm was noted and the remaining SiH fluid was added with cooling over an hour period to maintain the temperature between 75 and 90° C. At the end of the SiH fluid addition, heat was supplied to maintain the pot temperature at 80° C. for an additional hour. After cooling, the polymer had the following properties:

Viscosity — 351 centistokes at 25° C.
Epoxy content — ($C_2O$) — 11.3 per cent
Color — 4 G.V.S.
Residual SiH — 0.011 cc $H_2$/gram The above example was repeated without any sodium carbonate added and all other ingredients were incorporated as set forth above. The final viscosity of the product was 451 centistokes at 25° C. This high viscosity indicates epoxy side reaction during the addition reaction.

EXAMPLE II

Repeating Example I, except that sodium bicarbonate was substituted for the sodium carbonate, in the same amount by weight, where a hydrochloride acceptor is employed, the following results in a series of experiments are tabulated:

| EFFECTS OF SODIUM BICARBONATE ON ADDITION REACTIONS | | | | |
|---|---|---|---|---|
| | | Polymers Results | | |
| Experiment | $N_aHCO_3$ Present | Viscosity (cstk.) | Color (GVS) | Epoxy (%) | SiH (cc $H_2$/gm) |
| a. | Yes | 268 | 5 | 10.9 | 0.002 |
| b. | Yes | 264 | 6 | 11.0 | 0.007 |
| c. | Yes | 277 | 5 | 10.6 | 0.014 |
| d. | Yes | 288 | 5 | 10.6 | 0.011 |
| e. | Yes | 287 | 5 | 10.7 | 0.019 |
| f. | No | 312 | 5 | 10.6 | 0.014 |
| g. | No | 396 | 6 | 11.3 | 0.003 |
| h. | No | 340 | 5 | 10.6 | 0.003 |
| i. | No | 373 | 5 | 10.5 | 0.010 |

It is to be noted that in the case where sodium bicarbonate is not employed, that the viscosity of the polymer is greater, in some cases substantially greater, than the viscosity of the polymer made with sodium bicarbonate present.

EXAMPLE III

Repeating Example I, using 0.25 weight per cent tri-n-propylamine in place of the sodium carbonate, an epoxy siloxane polymer having the following properties was obtained:

| Viscosity | 318 |
|---|---|
| Epoxy Content ($C_2O$) | 11.3 |
| Color | 4 |
| Residual SiH | 0.03 cc $H_2$/gram. |

What is claimed is:

1. In the process of adding an ethylenically unsaturated 1,2-epoxy compound to a compound containing Si-H therein using chloroplatinic acid as the catalyst, the improvement which comprises providing a hydrogen chloride acceptor in combination with said catalyst to effect reaction with hydrogen chloride produced by decomposition of chloroplatinic acid during the chemical addition of said ethylenically unsaturated 1,2-epoxy compound to the compound containing Si-H therein and not after said chemical addition is effected.

2. The process of claim 1 wherein the acceptor is sodium carbonate.

3. The process of claim 1 wherein the acceptor is sodium bicarbonate.

4. The process of claim 1 wherein the acceptor is a tertiary amine.

* * * * *